Patented Oct. 23, 1923.

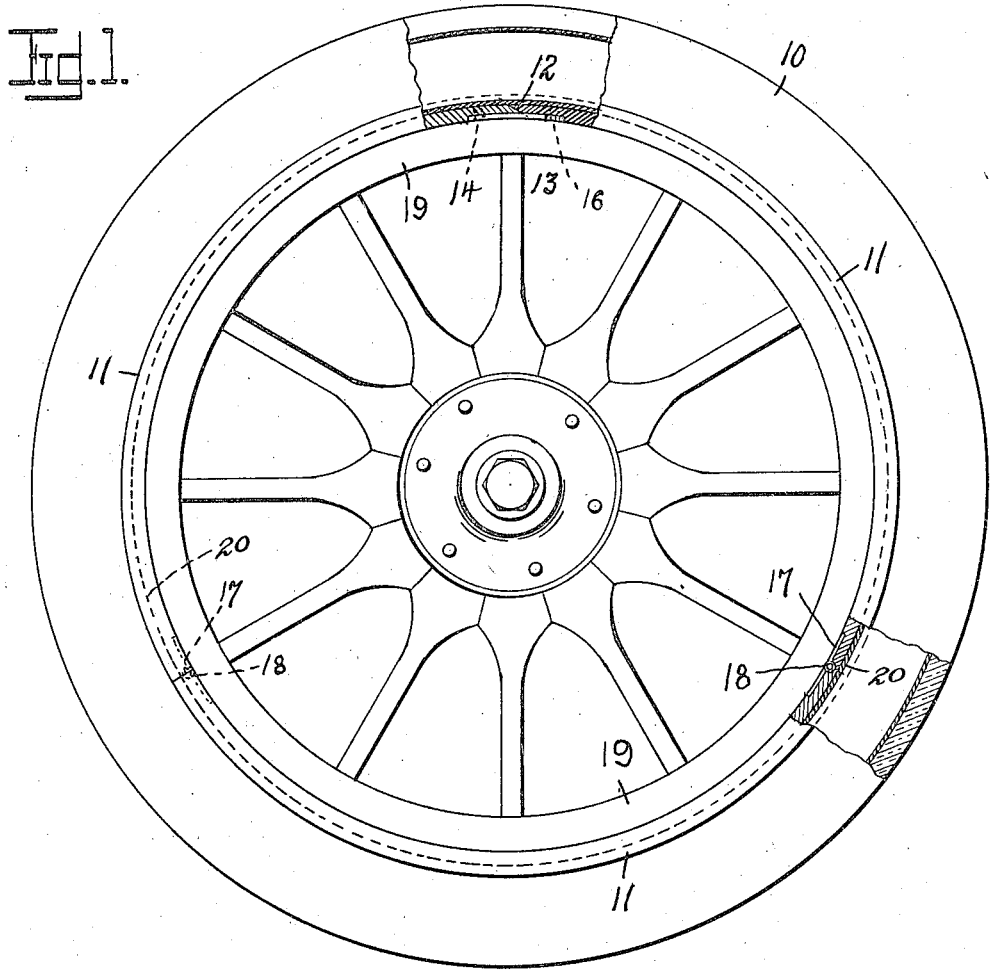
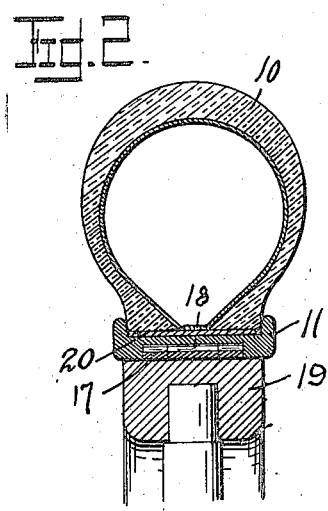
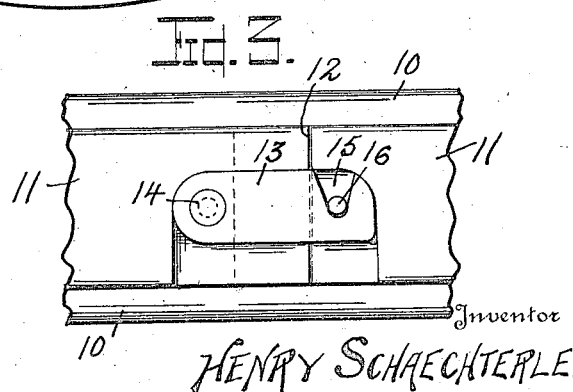

1,471,925

UNITED STATES PATENT OFFICE.

HENRY SCHAECHTERLE, OF FULLERTON, NEBRASKA.

COLLAPSIBLE RIM.

Application filed August 14, 1920. Serial No. 403,494.

*To all whom it may concern:*

Be it known that I, HENRY SCHAECH-TERLE, a citizen of the United States, residing at Fullerton, in the county of Nance and State of Nebraska, have invented certain new and useful Improvements in a Collapsible Rim, of which the following is a specification.

This invention relates to demountable rims for automobile wheels, and has for one of its objects to simplify the construction and increase the efficiency and utility of advices of this character.

Another object of the invention is to produce a device of this character which may be applied to or removed from a wheel felloe, without the use of tools or implements except the hands, and in the minimum amount of time, and without detaching any of the parts of the improved rim.

With these and other objects in view, the invention consists in certain novel features of construction as hereinafter shown and described and then specifically pointed out in the claims, and in the drawings illustrative of the preferred embodiment of the invention.

In the accompanying drawing:

Figure 1 is a side elevation of a wheel with the improved rim applied, and partly in section.

Fig. 2 is an enlarged transverse section on the line 2—2 of Fig. 1.

Fig. 3 is an enlarged detail illustrating the construction and operation of the locking device of the rim sections.

The improved rim may be readily adapted without material structural change to wheels of various forms and sizes, and to wheels having various forms of tires, but is designed more particularly for wheels having pneumatic tires, and for the purpose of illustration is shown applied to a conventional pneumatic tire, represented as a whole at 10.

The improved rim is formed in a plurality of sections 11, for instance three, and movably united at their confronting ends. The opposed ends of the sections 11, have their inner faces provided with registering recesses.

The confronting ends of one pair of the sections are reversely bevelled as shown at 12, and the bevelled terminals coupled detachably by a locking member 13 the latter being embedded in and operating in recesses in the rim sections as shown, and pivoted at 14 within the recess of one rim section and provided with a laterally opening socket 15 to engage a pin 16 in the recess of the adjacent rim section. The recesses in which the locking member 13 is arranged, open laterally.

The confronting ends of the inwardly opening recesses, and fitting in these recesses, are hinges 17, the "rolls" or pintle enclosing portions 18 of the hinges being disposed toward the outer faces of the rim sections, as shown, more clearly in Fig. 2.

By this means no portions of the hinges or the catch member 13 extend in advance of the inner faces of the sections, hence the rim sections lie flatly for their whole lengths upon the felloe 19 of the wheel.

The pressure is thus equalized and no blank or unsupported portions are present between the rim sections and the felloe.

Surrounding the rim sections 11 is a band 20 located between the tire 10 and rim 11, as shown in Figs. 1 and 2 to protect the inner tube and to support the rim sections.

The valve casing for the pneumatic tire is disposed through the parts in the usual manner.

The improved rim may be constructed to fit any size of wheel felloe, and can be removed and replaced by any person without previous skill or knowledge.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. A removable rim comprising a body portion formed of a series of segment-shaped sections arranged in end engagement and provided in the inner faces thereof at the opposed ends with registering recesses, the recesses of one pair of registering recesses opening laterally, a locking member pivotally connected to one wall of a laterally opening recess and detachably connected with one wall of the other laterally opening recess whereby a pair of sections are detachably connected together, and a hinge mounted in each of a pair of registering recesses and secured to a pair of sections for hinging them together, said member and hinges flush with the inner faces of said sections.

2. A removable rim comprising a body portion formed of a series of segmental-shaped sections, certain of said sections having the opposed ends thereof permanently hinged together, the other of said sections at the opposed ends thereof having their inner faces provided with registering recesses opening laterally, a pivoted locking means arranged in said registering recesses for detachably connecting said sections together, and an endless band mounted on the outer face of said sections.

In testimony whereof, I affix my signature hereto.

HENRY SCHAECHTERLE.